April 12, 1966     W. R. BURGESS     3,245,537
APPARATUS FOR PREPARING MINERAL-FREE WATER Filed Aug. 31, 1961     2 Sheets-Sheet 1

William R. Burgess
INVENTOR.

BY *Clarence A. O'Brien*
*and Harvey B. Jacobson*
Attorneys

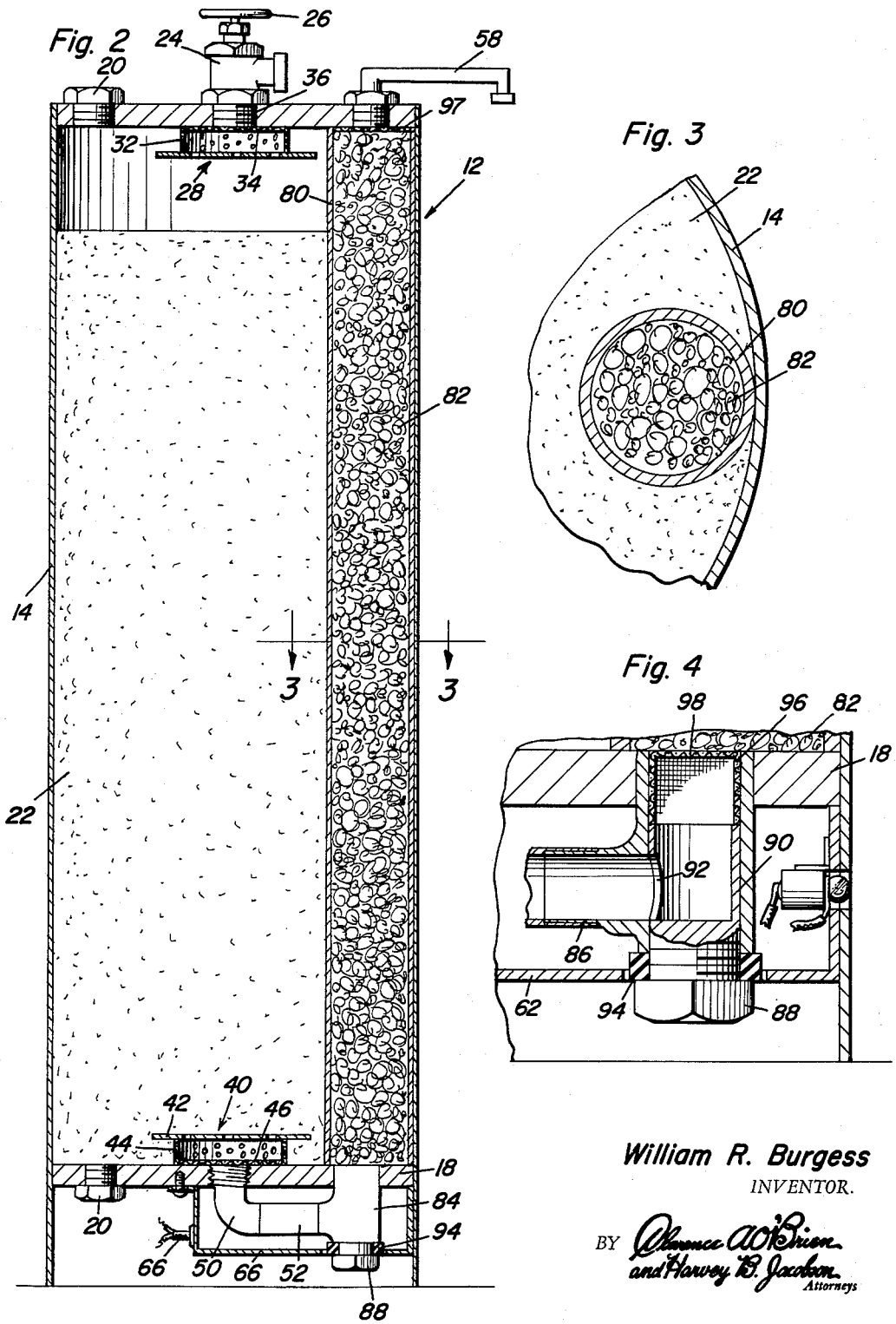

United States Patent Office 3,245,537
Patented Apr. 12, 1966

3,245,537
APPARATUS FOR PREPARING MINERAL-FREE WATER
William R. Burgess, El Paso, Tex., assignor to Continental Water Conditioning Corporation, El Paso, Tex., a corporation of Texas
Filed Aug. 31, 1961, Ser. No. 142,997
3 Claims. (Cl. 210—85)

The present invention generally relates to an apparatus for demineralizing water and this application is a continuation-in-part of copending application Serial No. 697,649, filed November 20, 1957, for Apparatus for Preparing Mineral-Free Water, now abandoned.

The primary object of the present invention is to provide a portable and highly efficient unit for demineralizing water together with an assembly for indicating the mineral content of the water discharged from the apparatus.

Briefly, the present invention employs a portable unit in the form of a container having a bed of ion exchange resins therein together with a diffuser plate on the top or inlet of the device and a diffuser plate on the bottom. The unit is also provided with a signal system for indicating the quality of the water discharged from the resin bed. The discharge tube for the demineralized water extends upwardly through the interior of the container or receptacle and terminates in the discharge faucet at the top of the unit in the interest of accessibility and compact arrangement. The unit may have an enlarged tube for discharging the water vertically through the container or receptacle which enlarged tube may be provided with activated carbon for further treatment of the water. Each end of the unit is provided with a filler plug and there is a novel assembly in the bottom end thereof which provides a novel removable plug for enabling access to the activated carbon chamber or tube for enabling replacement or regeneration of the activated carbon as well as the ion exchange resin.

As set forth in detail in the aforementioned copending application, there has been provided numerous water treating and purification devices but such devices have generally been too complicated and costly except for use in commercial or industrial establishments. There has been some endeavor to provide a small treatment unit for water such as devices for "softening" water by converting the minerals therein such as by the use of Zeolite resins and the like.

An essential feature of the present invention is the provision of a portable, compact and highly efficient unit which actually demineralizes the water or prepares mineral-free water with all features of the invention being organized, constructed and arranged to produce a high performance demineralizing unit which renders the device economically feasible for installation requiring relative small quantities of demineralized water such as installation in homes, small laboratories and the like.

The orientation of the filler plug in relation to the activated carbon charge also has a filter or screen element associated therewith for preventing entry of the carbon charge into the sampling chamber which houses portions of the signal system for indicating the quality of the water discharged from the ion exchange resin bed.

It is an object of the invention to provide a small portable unit that can be installed anywhere, for example in an industrial plant, office, home, in a water cooler designed for its use, etc., and which has self-contained means to extract unwanted minerals and chemicals from the water. The unit has a signal device operatively connected with the unit for indicating exhaustion when the mineral content of the effluent becomes substandard, at which time a rejuvenated unit is connected and the exhausted unit is returned to the supplier for servicing.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 2 is a longitudinal, vertical sectional view of a modified unit having an activated charcoal receiving tube therein;

FIGURE 3 is a transverse, sectional view taken substantially upon a plane passing along section line 3—3 of FIGURE 2 illustrating the structure of the activated carbon tube; and FIGURE 4 is an enlarged fragmental sectional view of the filler plug and screen assembly providing access to the activated carbon tube for replacement thereof.

Figure 1:
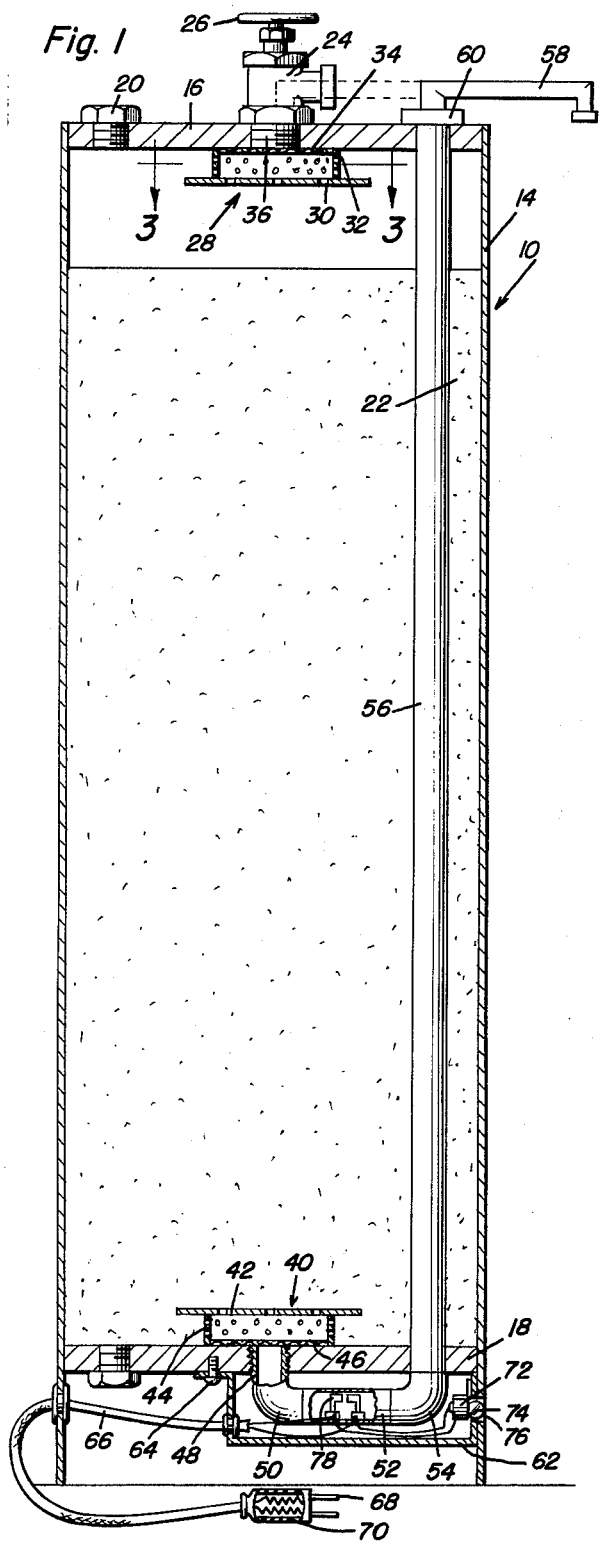
FIGURE 1 is a longitudinal vertical sectional view of the demineralizing unit of the present invention.

Referring now specifically to the drawings, the numeral 10 generally designates the demineralizing unit of the present invention as illustrated in FIGURE 1, and the numeral 12 generally designates the unit as illustrated in FIGURES 2, 3 and 4. In each of the forms of the invention disclosed in FIGURES 1–4, there is provided a casing 14 preferably of cylindrical construction although the shape thereof may vary as may the size. The casing may be constructed of any suitable material such as a plastic and is provided with a top wall 16 and a bottom wall 18 each having a removable plug 20.

Disposed in the casing 14 is a bed of ion exchange resins 22. Two types of resins may be employed and they are thoroughly mixed. One type of resin removes the cations (calcium, magnesium, sodium, etc.) from the water and the other type removes the anions (carbonate, chloride, sulphate, etc.) thus rendering a mineral-free water when water having minerals therein is passed through the bed. The proportions of the anion type of resin to the cation type of resin is preferably 3:2.

At the upper end of the casing 14 and extending through the top wall 16 is a raw water inlet fitting 24 having a manually controlled valve 26 associated therewith for controlling the raw water inlet to the top of the resin bed 22. Also, a top diffusion plate assembly generally designated by the numeral 28 is supported from the top wall 16 and includes a circular member 30 spaced from the top wall 16 by a cylindrical member 32 having a top wall 34 attached to the fitting 24 in any suitable manner such as by welding or the like to the screw-threaded nipple 36 extending through the top wall 16 to which the fitting 24 may be attached. The circular plate 30 and the cylindrical wall 32 are both apertured for diffusing the water as it enters the resin bed 22 to prevent channeling of the resin bed and assuring that the water will be substantially evenly distributed throughout the top surface area of the resin bed 22.

A diffusion plate assembly 40 is also provided adjacent the bottom plate 18 and includes a circular plate 42 and a cylindrical plate 44 both of which are apertured and the cylindrical plate or member 44 is provided with an end plate 46 attached to an outlet fitting 48 which communicates with an outlet elbow 50 connected with a horizontally disposed tubular member which is in the form of a sampling chamber 52. The end of the sampling chamber 52 is connected with an elbow 54 by which a discharge pipe 56 extends upwardly back through the bottom plate 18 and then up through the resin bed 22 and through the top plate 16. The upper end of the discharge pipe 56 extends through the top wall 16 and terminates in a faucet or spigot 58 connected to the upper end of the tube or pipe 56 by a suitable swivel connection 60 whereby the faucet 58 may be swung from a position with the discharge end disposed exteriorly of the confines of the casing 14 to a position in which the faucet is completely disposed within the confines of the casing 14 as illustrated in dotted line in FIGURE 1.

Disposed below the bottom plate 18 is a bracket in the form of a casing 62 attached to the bottom plate 18 by fasteners 64 or the like. This casing encloses and supports a signal system including an electrical conductor 66 of the multiple wire type having a male plug 68 on one end thereof for insertion into any suitable outlet such as is normally provided in households. The male plug 68 is provided with built-in resistor elements 70. The other end of the conductor 66 is electrically connected with a light socket 72 having a light bulb 74 therein which is mounted in a suitable manner so that the light bulb 74 is observable through an opening 76. Actually, the light bulb 74 may extend to a position substantially flush with the external surface of the casing 14 whereby the casing 14 serves as a protector for the light bulb but yet enables the light bulb to be moved and replaced when desired. A pair of contact elements 78 are disposed in the sampling chamber 52 for testing the quality of the water as it is discharged from the resin through the discharge tube 56.

In FIGURES 2 and 4, the inlet structure and the outlet structure for the resin bed is substantially the same except that the discharge pipe or tube extending upwardly through the casing 14 is in the form of an enlarged pipe 80 which is filled with activated carbon 82 which further purifies the water. In this form of the invention, the elbow 54 is replaced with a T-fitting 84 communicated with the sampling chamber 52 and connected thereto by a suitable joint 86. The lower end of the T-fitting 84 is closed with a screw threaded closure plug 88 having a sleeve 90 extending upwardly into the T-coupling 84. The sleeve 90 is provided with an opening 92 for alignment with the opening in the branch of the T-coupling and a sealing gasket 94 is provided for sealing the closure cap or plug 88 in relation to the end of the T-fitting 84. On the upper end of the hollow sleeve 90, there is provided a cylindrical screen 96 having a top closure plate 98 which serves to screen or filter the water as it passes into the activated charcoal and also serves to retain the charcoal within the confines of the pipe 80 during normal use which is also the function of screen 97 at the upper end of pipe 80. However, when desired, the activated charcoal 82 may be removed by merely removing the plug 88 along with the sleeve 90 and the screen 96 all of which are interconnected thus enabling the charcoal to be removed from the enlarged pipe 80 and replaced if desired.

The remainder of the structure of the form of the invention illustrated in FIGURE 2 is the same as disclosed in FIGURE 1.

As is normal for all demineralization systems, the resins eventually become exhausted and unable to produce a mineral free water. The number of gallons which can be processed depends on several variables. The first depends on the quantity of resins in the unit. Naturally, the unit can be sized according to the application. It will not be uncommon to have several different sizes depending on the quantities and flow rate desired. The second consideration when discussing unit capacity concerns the mineral content of the water being treated. This regeneration system provides a capacity of twelve thousand grains (expressed as calcium carbonate) total solids removable per cubic foot of mixed resins. Thus, assuming one cubic foot would be in use, a water containing 20 grains per gallon (expressed as calcium carbonate) would result in a unit capacity of approximately 600 gallons.

One extremely important consideration is the determination of unit endpoint, or that time at which the unit is no longer functioning to completely remove the contaminants from water. At this point, the contaminants will begin to come through the then exhausted mixed bed resin and show up in the treated water. It is felt that a simple method of determining this endpoint is in order when one considers the use and application of this equipment. The most simple would be the use of pH paper which would show a change from neutral to either acidity or alkalinity. These indicator papers have been used for this purpose for many years. They function to show a pH change by merely wetting them with the sample being tested. At this point, it must be remembered that each of the two different types of resins exhibits a definite capacity for mineral removal. It is our plan, therefore, to add a slight excess of the cation exchange resin, thus assuring that the first resin to become exhausted will be the anion exchange resin. At exhaustion, therefore, there will be a marked drop in pH value of the water being treated. This will be due to the introduction of trace amounts of anions from the exhausted anion bed, and hydrogen ions being introduced to the water from the still partially regenerated cation exchange resin. Thus, a marked pH drop will be noted at unit exhaustion. The user has merely to introduce this type of pH paper to the treated water in order to determine when it is no longer safe to use that particular unit.

There are several other ways to indicate unit endpoint. These would include the light circuit disclosed. It should be pointed out that this light can be activated by either a 110-volt circuit, or can also function with small batteries as a power source. Obviously, the portable characteristic of this unit would indicate the use of a battery power supply. In addition, a Solu-Bridge type arrangement could be used to indicate changes in resistance or conductivity of the water which would also show endpoint. Furthermore, a Geiger counter could be used to detect the presence of the first traces of radioactive matter in the treated water. It is the purpose of this unit to use any one of these deemed most satisfactory for the particular application in mind, although as stated above, it is felt that a simple check with a pH paper would be the most economical and advantageous.

Although the present invention is primarily intended for use as a portable unit providing a highly efficient demineralization system, it can also be incorporated into many other embodiments.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A portable demineralizing unit for use in homes or the like and being capable of easy removal for regeneration when servicing is required, said unit comprising a generally vertically disposed casing having a peripheral wall and spaced end walls, valved inlet means in the top wall for enabling introduction of untreated water into the upper end of the casing, a mixture of cation exchange and anion exchange resins in said casing, diffuser means mounted from the top wall for distributing the water introduced into the casing over the entire area of the resins to eliminate channelization through the resins, outlet means communicating with the bottom of the casing through the bottom wall, diffuser means supported from the bottom wall above the outlet means to enable demineralized water to enter the outlet means at a plurality of points, said outlet means including a passage for receiving demineralized water, a pair of spaced electrodes extending into the passage, a source of electrical potential connected across said electrodes for establishing a circuit including the water in the passage which serves as a portion of the circuit for electrically connecting the electrodes, a lamp in said circuit providing a visible indication of the mineral content of the water, said circuit being constructed and arranged whereby said lamp remains energized when the demineralization of the water is complete and the water is substantially electrically non-conductive and becomes extinguished when the water flowing through the passage contains a sufficient mineral content to conduct a predetermined amount of current to shunt the lamp circuit, a discharge tube for demineralized water extending vertically throughout the length of the interior of the casing adjacent the peripheral wall, means communicating the lower end of the discharge tube with the outlet means, and a discharge faucet carried by the upper end of the casing and communicated with the discharge tube for discharging demineralized water at the top end of the casing, and means within the discharge tube for additionaly treating the demineralized water.

2. The structure as defined in claim 1 wherein said means within the discharge tube includes a quantity of activated carbon, a screen across the top end of the discharge tube to prevent carbon from being discharged with the demineralized water.

3. The structure as defined in claim 2 wherein the bottom end wall of the casing forms a partial closure for the bottom of the discharge tube, said means communicating the outlet means and the discharge tube including a T-shaped fitting having one end extending through the bottom end wall and communicating with the bottom of the discharge tube, the branch of the T-shaped fitting being connected with the outlet means, the other end of the T-shaped fitting being closed by a removable closure plug, a screen retained within the T-shaped fitting in the flow passage of water to prevent activated carbon from falling downwardly into the T-shaped fitting except when the plug and screen are removed thereby enabling the activated carbon to be removed and replaced if desired, and removable plug means in said casing at each end thereof to facilitate removal of said resins.

References Cited by the Examiner
UNITED STATES PATENTS

| | | | |
|---|---|---|---|
| 1,457,503 | 6/1923 | Cross | 210—62 |
| 1,685,816 | 10/1928 | Kenney | 210—283 |
| 1,689,308 | 10/1928 | Stickney | 210—281 |
| 1,706,777 | 3/1929 | Eisenhauer | 210—283 |
| 1,905,021 | 4/1933 | Wagner | 210—85 X |
| 2,082,322 | 6/1937 | Brundage | 210—283 |
| 2,238,896 | 4/1941 | Gibbons | 210—62 |
| 2,435,975 | 2/1948 | McGill | 210—281 |
| 2,572,082 | 10/1951 | Welsh | 210—85 |
| 2,617,766 | 11/1952 | Emmett et al. | 210—25 |
| 2,661,333 | 12/1953 | Schein | 210—62 X |
| 2,666,741 | 1/1954 | McMullen | 210—30 |
| 2,736,698 | 2/1956 | Klumb | 210—33 |
| 2,792,566 | 5/1957 | Shanhouse et al. | 116—118 |
| 2,861,689 | 11/1958 | Lyall | 210—289 X |

REUBEN FRIEDMAN, *Primary Examiner.*

HERBERT L. MARTIN, *Examiner.*